US011289222B2

(12) United States Patent
Boutin

(10) Patent No.: US 11,289,222 B2
(45) Date of Patent: Mar. 29, 2022

(54) METHOD AND DEVICE FOR UNLATCHING CONTROL ROD DRIVE SHAFTS IN PRESSURIZED WATER REACTORS

(71) Applicant: Framatome Inc., Lynchburg, VA (US)

(72) Inventor: Alex Boutin, Lynchburg, VA (US)

(73) Assignee: Framatome Inc., Lynchburg, VA (US)

( * ) Notice: Subject to any disclaimer, the term of this patent is extended or adjusted under 35 U.S.C. 154(b) by 1089 days.

(21) Appl. No.: 15/923,764

(22) Filed: Mar. 16, 2018

(65) Prior Publication Data

US 2019/0287690 A1 Sep. 19, 2019

(51) Int. Cl.

*G21C 19/115* (2006.01)
*G21C 19/105* (2006.01)
*G21C 19/11* (2006.01)
*G21C 7/117* (2006.01)

(52) U.S. Cl.

CPC ............ *G21C 19/115* (2013.01); *G21C 7/117* (2013.01); *G21C 19/105* (2013.01); *G21C 19/11* (2013.01)

(58) Field of Classification Search

CPC ...... G21C 19/10; G21C 19/105; G21C 19/11; G21C 19/115
USPC .................................................. 376/235, 236
See application file for complete search history.

(56) References Cited

U.S. PATENT DOCUMENTS 2,751,229 A 6/1956 Schultz
2,794,670 A 6/1957 Menegus et al.
2,949,202 A 8/1960 Treshow
3,212,980 A 10/1965 Stanley et al.
3,337,257 A 8/1967 Brynsvold
3,851,987 A * 12/1974 Jones .................... G21C 19/11 403/374.4
3,905,634 A 9/1975 Johnson et al.
3,936,089 A 2/1976 Hoffmeister
4,244,616 A 1/1981 Buckalet
4,585,611 A 4/1986 Perl
(Continued)

FOREIGN PATENT DOCUMENTS

CN 101783188 7/2010
CN 103559919 2/2014
(Continued)

OTHER PUBLICATIONS

Search Report for corresponding European patent application EP19162974.

*Primary Examiner* — Jack W Keith
*Assistant Examiner* — Jinney Kil
(74) *Attorney, Agent, or Firm* — Davidson, Davidson & Kappel, LLC

(57) ABSTRACT

An unlatching tool configured for actuating a movable section of a control rod drive shaft in a pressurized water reactor includes a base; a gripper assembly configured for gripping the movable section of the control rod drive shaft; a rod movably connecting the gripper assembly to the base; and a mechanical actuator fixed to the base and configured for rotating the rod to raise and lower the gripper assembly. A method for actuating a movable section of a control rod drive shaft includes installing an unlatching tool on the control rod drive shaft; latching the unlatching tool to a stationary section of the control rod drive shaft; and raising a rod connected to a gripper assembly to cause the gripper assembly to grip the movable section and move the movable section upward.

19 Claims, 7 Drawing Sheets

(56) References Cited

U.S. PATENT DOCUMENTS

| | | | | |
|---|---|---|---|---|
| 4,713,210 | A * | 12/1987 | Germer .................... | G21C 9/02 376/233 |
| 4,885,123 | A | 12/1989 | Ikeuchi et al. | |
| 5,253,407 | A | 10/1993 | Jamrus | |
| 5,329,563 | A | 7/1994 | Baversten | |
| 6,501,813 | B1 | 12/2002 | Soma et al. | |
| 9,025,720 | B2 | 5/2015 | Tylman | |
| 2011/0235769 | A1 * | 9/2011 | Stefko .................. | G21C 19/115 376/260 |
| 2012/0069947 | A1 | 3/2012 | Ketcham et al. | |

FOREIGN PATENT DOCUMENTS

| | | | |
|---|---|---|---|
| DE | 1922426 | | 1/1958 |
| DE | 1194645 | | 6/1965 |
| DE | 1211344 | | 2/1966 |
| DE | 1464268 | | 3/1969 |
| DE | 2344264 | | 3/1975 |
| DE | 7536857 | U | 6/1976 |
| EP | 0626699 | | 11/1994 |
| FR | 1233492 | A | 10/1960 |
| FR | 1413991 | | 10/1965 |
| FR | 2045598 | A | 3/1971 |
| FR | 2394149 | | 1/1979 |
| GB | 968137 | | 8/1964 |
| GB | 1088969 | | 10/1967 |
| GB | 1122981 | | 8/1968 |
| GB | 1182239 | | 2/1970 |
| GB | 1204703 | | 9/1970 |
| JP | H 095483 | | 1/1997 |
| JP | 2014 059152 | | 4/2014 |
| KR | 101493686 | B1 * | 2/2015 |

* cited by examiner

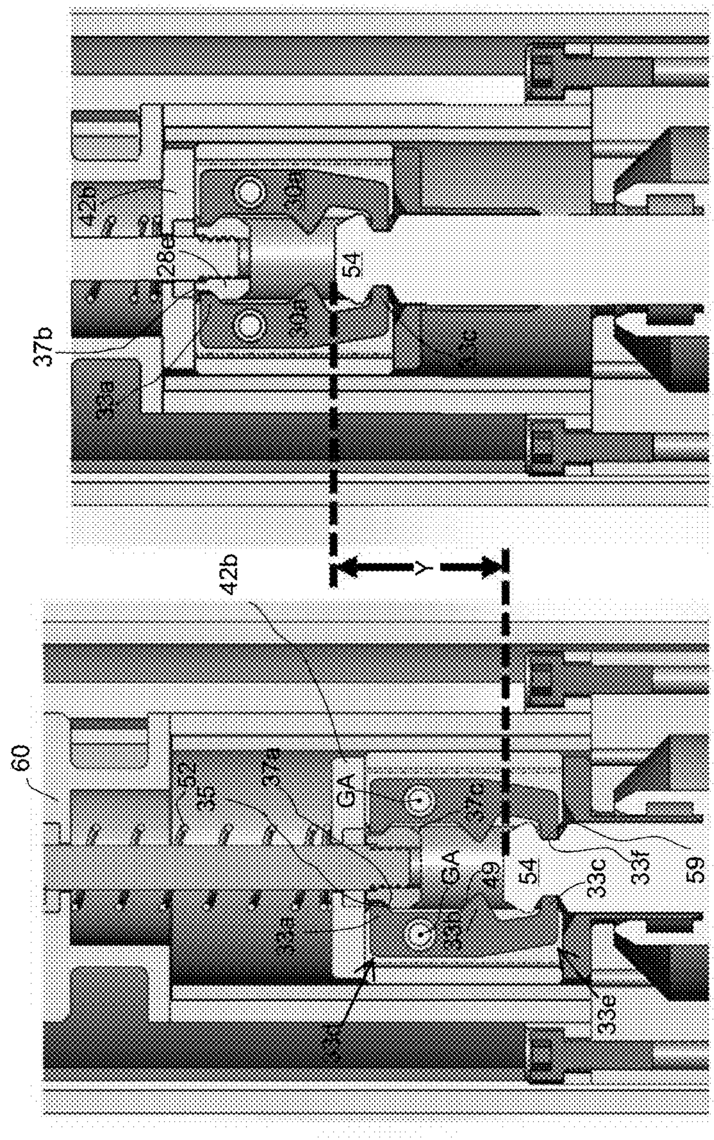
Fig. 3c
Fig. 3b
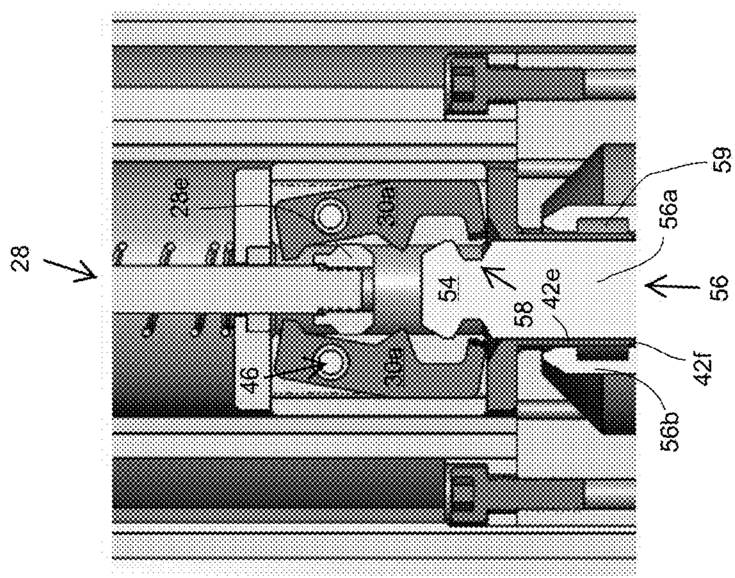
Fig. 3a

METHOD AND DEVICE FOR UNLATCHING CONTROL ROD DRIVE SHAFTS IN PRESSURIZED WATER REACTORS

The present disclosure relates generally to control rod drive shafts (CRDSs) in nuclear reactors and more specifically to a method and device for unlatching CRDSs in pressurized water reactors (PWRs).

BACKGROUND

Controls rods are used in nuclear reactors to control the rate of fission. In PWRs, the control rods typically are arranged in control rod clusters assemblies. Each control rod cluster assembly can include a spider with the control rods vertically extending downwardly from the spider. The control rod cluster assembly can be lowered via the spider into guide thimbles of the fuel assembly of a PWR to regulate the reactivity of the nuclear reactor core. A lower end of a CRDS is connected to the spider and an upper end of the CRDS is connected to a control rod drive mechanism fixed to a closure head of the pressure vessel.

During refueling of the PWR, the closure head is removed, the reactor vessel is flooded with water and the upper internals of the reactor vessel are removed. Such operations involve uncoupling each CRDS from the spider. Unlatching tools are used for gripping CRDSs on PWRs after the reactor vessel closure head is removed and the reactor cavity is flooded up with water. The unlatching tool can raise an actuator, i.e., a button, of the CRDS to uncouple the CRDS from the spider.

A long-handled unlatching tool is known that uses air cylinders, which are powered by nitrogen, to latch onto the drive shaft and to raise the drive shaft button. It is also hung from the hoist on the refueling bridge. One person controls the actual tool while another person manipulates the control valves. One version of this long-handled tool uses a combination of nitrogen and manual maneuvers for operation.

U.S. Pat. No. 9,025,720 discloses a method of unlatching a CRDS from a control rod assembly by pneumatically actuating the gripper assembly.

SUMMARY OF THE INVENTION

An unlatching tool configured for actuating a movable section of a control rod drive shaft in a pressurized water reactor includes a base; a gripper assembly configured for gripping the movable section of the control rod drive shaft; a rod movably connecting the gripper assembly to the base; and a mechanical actuator fixed to the base and configured for raising and lowering the gripper assembly.

A method for actuating a movable section of a control rod drive shaft includes installing an unlatching tool on the control rod drive shaft; latching the unlatching tool to a stationary section of the control rod drive shaft; and raising a rod connected to a gripper assembly to cause the gripper assembly to grip the movable section and move the movable section upward.

In accordance with another aspect, an unlatching tool configured for actuating a movable section of a control rod drive shaft in a pressurized water reactor includes a base; an outer assembly rotatably fixed to the base; an inner support assembly non-rotatably fixed to the base; a gripper assembly movably coupled to the base and configured for gripping the movable section of the control rod drive shaft; a latch rotatably coupled to the inner support assembly for rotation about a latch axis extending parallel to a center axis of the unlatching tool; and a latch actuator fixed to the outer assembly and configured for rotating the outer assembly about the center axis of the unlatching tool such that the latch is rotated about the latch axis radially inward toward the center axis of the unlatching tool.

BRIEF DESCRIPTION OF THE DRAWINGS

The present invention is described below by reference to the following drawings, in which:

FIGS. 3*a* to 3*c* show radial cross-sectional views illustrating the operation of the gripper assembly;

DETAILED DESCRIPTION

The present disclosure provides a tool for removing CRDSs of PWRs. The tool is used once the reactor head is removed and reactor cavity is flooded up with water to form a reactor pool. The tool attaches to the refueling bridge hoist and is operated from the refueling bridge work platform. The tool extends down into the reactor pool and fits over a single CRDS. The tool latches onto the drive shaft to gain positive control of the drive shaft and the tool is configured for raising the drive shaft button to uncouple the driveshaft from the rod control cluster assembly. In a similar fashion the tool is used to re-couple the driveshaft to the rod control cluster assembly during reactor re-assembly activities.

Existing tools require access to nitrogen/air which contributes to additional setup time and additional consumables, and require two personnel for operation. The existing tool has a tendency for flooded air cylinders which requires replacement during tool refurbishment and requires sites to keep continuous air/nitrogen hooked up to the tool if the site plans to leave the tool hanging on the cavity wall during reactor cavity flood up.

The tool of the present disclosure can be mechanically operated by a single operator, and can save dose and manpower. The tool is lowered onto the driveshaft until the knife-edge on the tool opens the driveshaft c-ring and the tool bottoms out on the driveshaft. The tool latches to the control rod driveshaft through an operator pulling and rotating a single handle which rotates a sleeve at the bottom of the tool which consequently rotates three latch toes into the existing groove on the driveshaft. The top of the tool contains a jacking screw mechanism which is connected to a series of rods which ultimately connects to a plunger that interacts with the tool's two button fingers. An operator turns the input shaft on the jacking screw mechanism by way of a 110V removable drive unit (the operator also has the option to turn the input shaft manually by way of a hand-wheel or wrench). The jacking screw mechanism will raise the plunger at the bottom of the tool which closes the button fingers around the driveshaft button and continues to raise the button to release the driveshaft from the control rod cluster assembly. Using the same mentioned functions, the tool can also be used to re-couple the CRDS to the control rod cluster assembly.

The tool of the present disclosure is not powered by air cylinder, but is instead mechanically actuated, and may be hung in a flooded reactor cavity without worry of flooding air cylinders, and may be more quickly set up with less space required on the refueling bridge. Hence little to no refurb is required for the tool and no measures need to be put in place as the tool hangs in a flooded cavity.

Figure 1A:
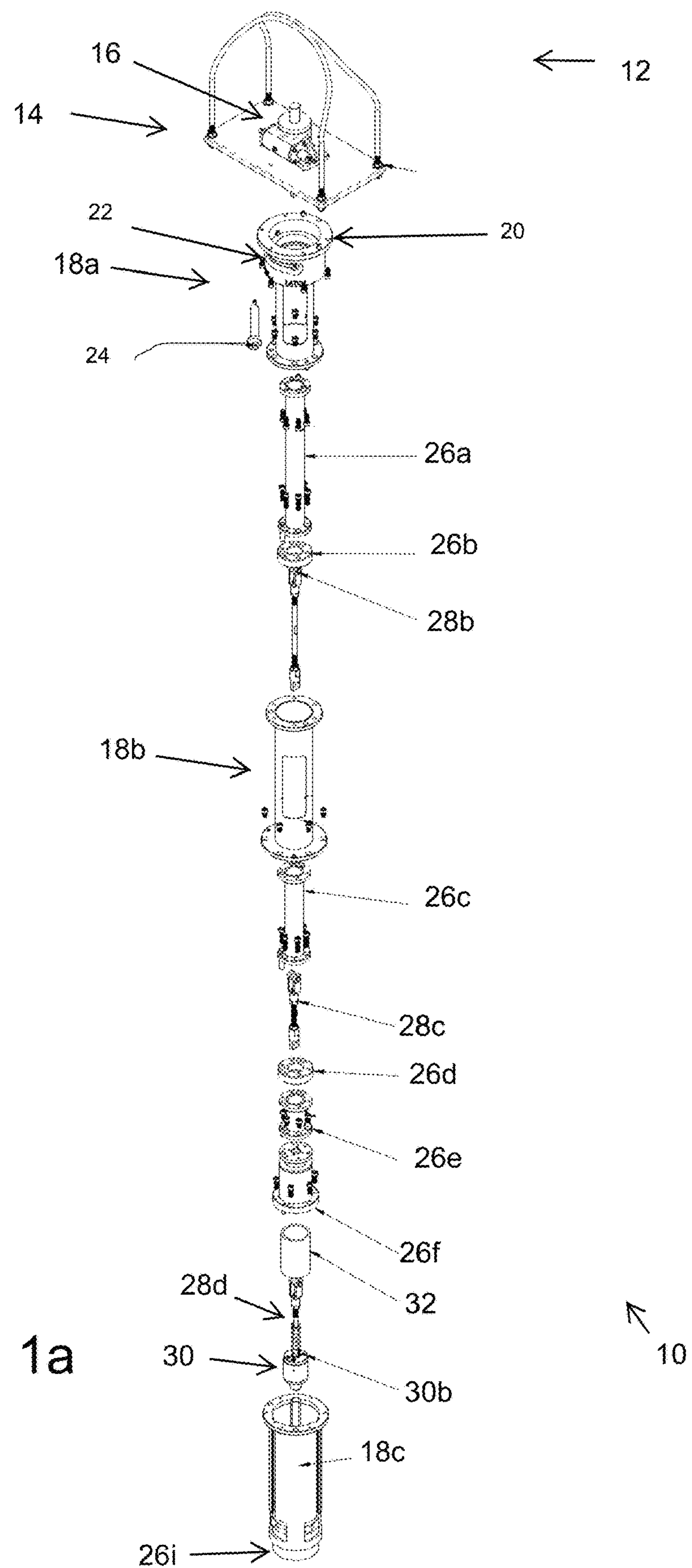
FIGS. 1*a*, 1*b* and 1*c* shows views of an unlatching tool in accordance with an embodiment of the present invention configured for unlatching a CRDS from and latching the CRDS to a control rod assembly.
Figure 1B:
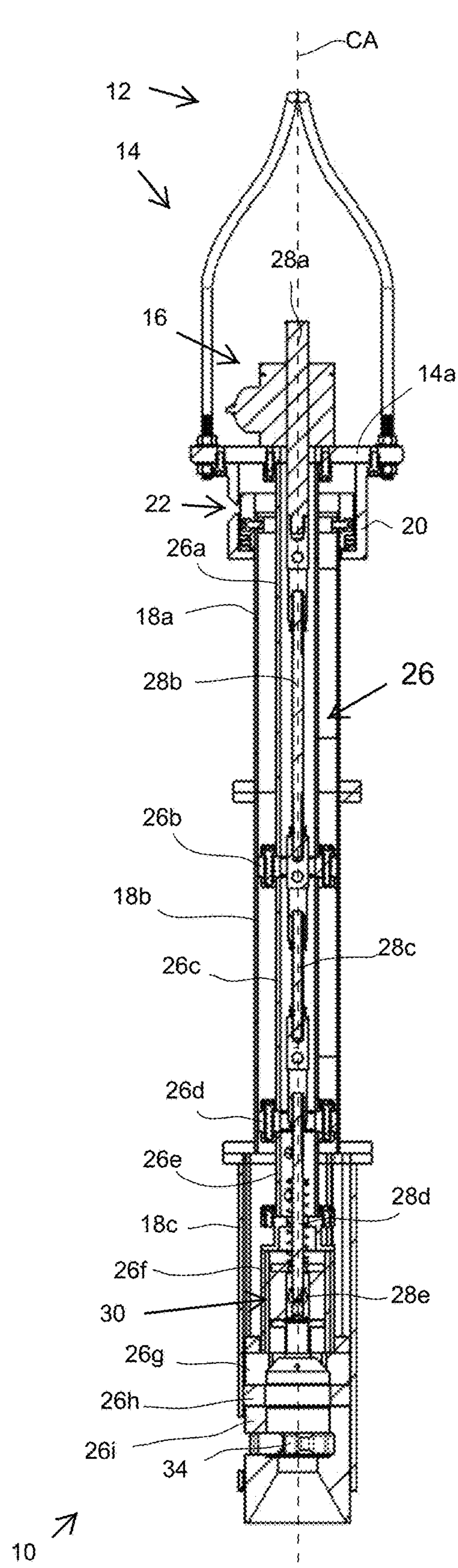
Figure 1C:
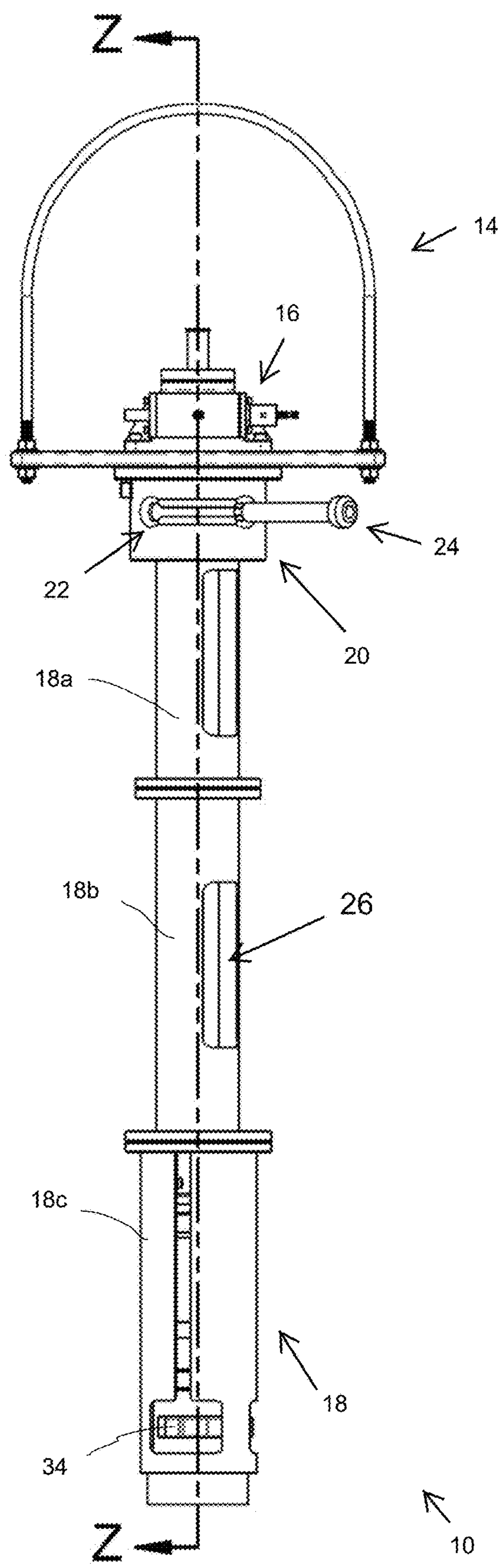

FIGS. 1*a*, 1*b* and 1*c* shows views of a unlatching tool 10 in accordance with an embodiment of the present invention configured for unlatching a CRDS from and latching the CRDS to a control rod assembly. Unlatching tool 10 extending longitudinally along a center axis CA. As used herein, the terms radially, axially, circumferentially and tangentially are used in reference to center axis CA. FIG. 1*a* shows an exploded view of unlatching tool 10, FIG. 1*b* shows a side view of unlatching tool 10 and FIG. 1*c* shows a radial cross-sectional view of unlatching tool 10 along Z-Z in FIG. 1*b*.

Unlatching tool 10 includes, at an upper end 12 thereof, a bail assembly 14 configured for being attached to a refueling bridge hoist. Bail assembly 14 supports a mechanical gripper actuator 16 configured for actuating grippers 30*a*.

Unlatching tool 10 also includes an outer assembly 18, which is a cylindrical mast, formed by outer sections 18*a*, 18*b*, 18*c*. The outer sections include an upper outer section 18*a*, an intermediate outer section 18*b* and a lower outer section 18*c*. In this embodiment, the outer assembly is formed by three outer sections, but other embodiments may include other amounts of outer sections. The outer assembly 18 is rotatable with respect to bail assembly 14. More specifically, outer sections 18*a*, 18*b*, 18*c* are non-rotatably fixed to each other and are rotatably fixed to bail assembly 14. The outer assembly 18 is rotatably fixed to bail assembly 14 by an upper base section 20. Bail assembly 14 and base section 20 form a base of unlatching tool 10.

Upper base section 20 is non-rotatably fixed to bail assembly 14 and includes a guide 22 configured for a guiding latch actuator 24 configured for actuating latches 34 via outer assembly 18. More specifically, an upper end of upper base section 20 is fixed to a base plate 14*a* of bail assembly 14. An upper end of outer assembly 18 is rotatably received inside of upper base section 20. More specifically, an upper end of upper outer section 18*a* is rotatably received inside of upper base section 20.

Unlatching tool 10 also includes an inner support assembly 26, which is a cylindrical mast, formed by a plurality of inner support sections 26*a* to 26*i*. Inner support assembly 26 is positioned inside of outer assembly 18. Inner support assembly 26 is non-rotatably fixed with respect to bail assembly 14. Accordingly, outer assembly 18 is rotatable with respect to inner support assembly 26. Inner support sections 26*a* to 26*i* are non-rotatably fixed to each other and are non-rotatably fixed to bail assembly 14. More specifically, an upper end of upper inner support section 26*a* is fixed to base plate 14*a* of bail assembly 14.

Unlatching tool 10 further includes a movable rod 28. Rod 28 movably connects a gripper assembly 30 to the base. Rod 28 extends inside of inner support assembly 26. Rod 28 is movably fixed to bail assembly 14 by actuator 16. More specifically, rod 28 is axially movably fixed to bail assembly 14 by actuator 16, and is axially movable within inner support assembly 26. Movable rod 28 includes a plurality of rod sections 28*a* to 28*e*. Mechanical actuator 16 is fixed to the base and configured for raising and lowering rod 28 to raise and lower gripper assembly 30.

A lower end of movable 28 engages gripper assembly 30, which is configured for gripping the button of a CRDS. Gripper assembly 30 is positioned inside of inner support section 26*f* and is actuatable by the axial movement of rod 28. Gripper assembly 30 includes a grippers 30*a* (FIGS. 2*a* to 2*c*) inside of a gripper housing 30*b*. A cylindrical bushing 32 is provided radially between gripper housing 30*b* and inner support section 26*f*. More specifically, bushing 32 is provided inside of an inner diameter surface of inner support section 26*f* and outside of an outer diameter surface of housing 30*b*.

Latches 34 are fixed to the lower end of inner support assembly 26. More specifically, latches 34 are movably fixed to lowermost inner support section 26*i*. Movement of outer assembly 18 via actuator 24 causes latches 34 to be actuated between a latching orientation and an unlatched orientation. Such latching/unlatching mechanism and functioning are more detailed hereunder in description related to FIGS. 4*a* to 4*f* and FIG. 5.

Figures 2A, 2B, 2C:
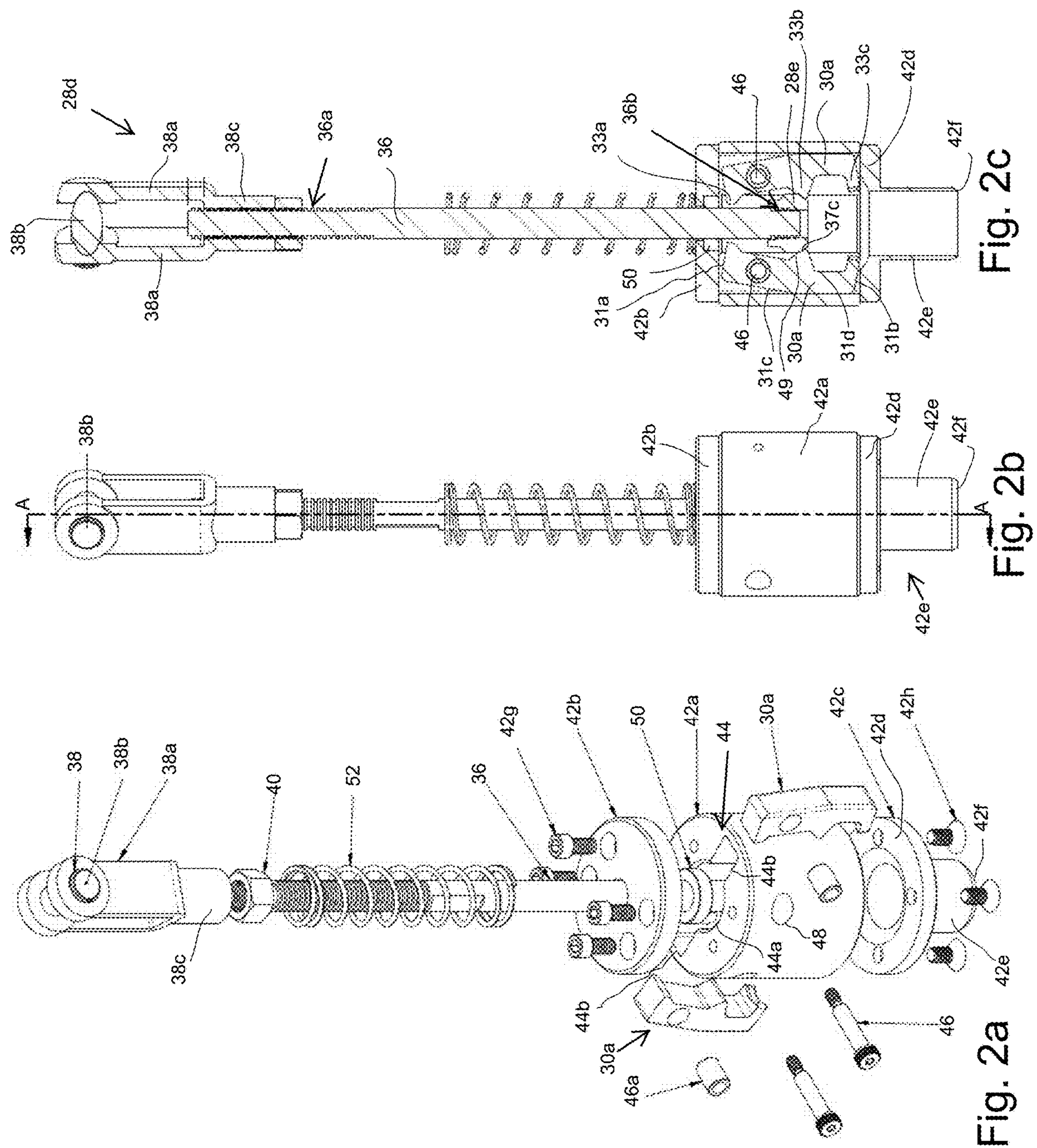
FIGS. 2*a* to 2*c* show views of a gripper assembly and a lower end of a rod of the unlatching tool.

FIGS. 2*a* to 2*c* show views of gripper assembly 30 and the lower end of rod 28. FIG. 2*a* shows a perspective view, FIG. 2*b* shows a side view and FIG. 2*c* shows a radial cross-sectional view along A-A in FIG. 2*b*. The lower end of rod 28 is formed by a lower rod section 28*d* and a gripper contact section 28*e* fixed to the lower end of lower rod section 28*d*. Lower rod section 28*d* includes a threaded shaft 36 including a threaded upper end 36*a* and a threaded lower end 36*b*. Section 28*d* further includes a clevis 38 screwed onto threaded upper end 36*a* and a nut 40 axially aligning clevis 38 on shaft 36. Clevis 38 includes two prongs 38*a* holding a pin 38*b*, and a cylindrical base 38*c* having a threaded bore that receives threaded upper end 36*a* of shaft 36.

Gripper housing 30*b* includes a cylindrical base section 42*a*, an annular upper plate 42*b* fixed to a top of base section 42 and a lower section 42*c* fixed to a bottom of base section 42*a*. Lower section 42*c* includes an annular plate section 42*d* contacting a lower surface of base section 42*a* and a cylindrical section 42*e* extending downward from plate section 42*d*. A lower end of cylindrical section 42*e* has a frustoconical shape to define a knife edge 42*f*. Upper plate 42*b* is fixed to base section 42*a* by a plurality of fasteners 42*g* passing through plate 42*b* and into holes in base section 42*a* and lower section 42*c* is fixed to base section 42*a* by a plurality of fasteners 42*h* passing through plate section 42*d* and into holes in base section 42*a*. Base section 42*a* is provided with a slot 44 passing from an upper surface base section 42*a* to a lower surface of base section 42*a*. Slot 44 includes a center cylindrical section 44*a* for receiving gripper contact section 28*e* and threaded lower end 36*b*. Extending radially outward from center cylindrical section 44*a*, slot 44 further includes two outer sections 44*b*, each shaped for receiving one of grippers 30*a*.

Grippers 30*a* are rotatably fixed to base section 42*a* by tangentially fasteners 46 passing through tangentially extending holes 48 formed in base section 42*a*. Grippers 30*a* are held on fasteners 46 via bushings 46*a*. Grippers 30*a* are rotatable about fasteners 46 within slot 44. Grippers 30*a* are elongated vertically and include an upper surface 31*a*, a lower surface 31*b*, an outer surface 31*c* and an inner surface 31*d*. Outer surface 31*c* faces away from rod 28 and toward inner support assembly 26 and extends upward from lower surface 31*b* to upper surface 31*a*. Inner surface 31*d* faces toward rod 28 and away from inner support assembly 26 and extends upward from lower surface 31*b* to upper surface 31*a*. Inner surface 31*d* is provided with three contact sections formed as protrusions—an upper protrusion 33*a* forming a gripper engagement contact section, an intermediate protrusion 33*b* forming a gripper release contact section and a lower protrusion 33*c* forming a gripping section. FIG. 2*c* shows grippers 30*a* in a non-gripping orientation with gripper contact section 28*e* contacting intermediate protrusion 33*b* to hold grippers 30*a* away from each other 30*a*. More specifically, a tapered lower surface 37*c* of gripper contact section 28*e* contacts a tapered upper surface 49 of protrusion 33*b* to hold grippers 30*a* away from each other 30*a*. When unlatching tool 10 is installed onto the button of a CRDS, grippers 30*a* are in the non-gripping orientation shown in FIG. 2*c*.

Upper plate 42*b* is provided with an annular groove in the lower surface thereof receiving a bushing 50 arranged on shaft 36. A spring 52 surrounds a portion of an outer circumferential surface of shaft 36 and axially abuts an upper surface of upper plate 42*b*.

Figure 3D:
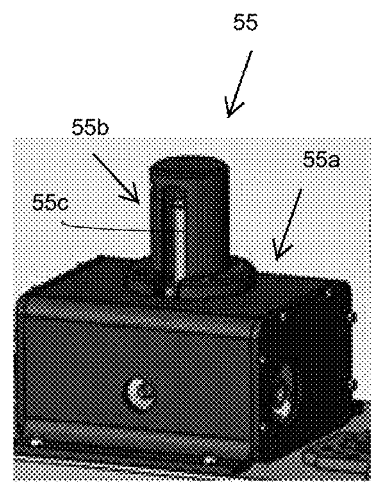
FIG. 3*d* shows a cover provided over a gripper actuator and an upper end of the rod of unlatching tool.

FIGS. 3*a* to 3*c* show radial cross-sectional views illustrating the operation of gripper assembly 30. FIG. 3*a* shows rod 28 moved upward in comparison with the orientation shown in FIG. 2*c*. Rod 28 is moved upward by actuator 16. As shown in this FIG. 4*a*, actuator 16 is a screw jack that engages threads of upper rod section 28*a* of rod 28 to move rod 28 axially upward and downward. In this embodiment, actuator 16 is mechanically operated to axially move the upper rod section 28*a* without rotating upper rod section 28*a*; however, in other embodiments, other kinematics of the actuator 16 combined with upper rod section 28*a* can generate the motion to raise and lower gripper assembly 30. Actuator 16 is mounted on top of base plate 14*a* of bail assembly 14. An operator can rotate an input shaft 16*a* on screw jack by way of a removable electrical drive unit or the operator also can turn input shaft 16*a* manually by way of a handwheel or wrench. As shown in FIG. 3*d*, a cover 55 may be provided over actuator 16 and the upper end of upper rod section 28*a*. Cover 55 includes a lower section 55*a* surrounding actuator 16 and an upper section 55*b* on top of lower section 55*a* surrounding the upper end of upper rod section 55*b*. Upper section 55*b* includes a slot 55*c* formed therein allowing an operator to view of a height of the upper end of upper rod section 55*b*, and upper section 55*b* may be provided with a numeral scale, such as that on a ruler, to indicate the value of the height based on a position of the top edge of upper rod section 55*b*.

Referring back to FIG. 3*a*, gripper contact section 28*e* has been moved out of contact with intermediate protrusion 33*b* and is being moved upward away from a button of a CRDS 56. CRDS 56 includes an axially movable section 56*a*, which forms the button, and a stationary section 56*b*. In order to release CRDS from the attached control rod assembly, movable section 56*a* is moved upward while stationary section 56*b* remains in place. A lower end of a head 54 of button is defined by an annular groove 58 formed in movable section 56*a*. A c-ring 59 is provided radially between an upper end of stationary section 56*b* and an outer circumferential surface of movable section 56*a*. Unlatching tool 10 is placed onto CRDS 56 such that the lower end of gripper assembly 30, in particular cylindrical section 42*e* of lower section 42*c*, rests on stationary section 56*b* in an annular space formed between the upper end of stationary section 56*b* and the outer circumferential surface of movable section 56*a*. Knife edge 42*f* is configured to contact and open c-ring 59 to allow gripper assembly 30 to bottom out on CRDS 56.

FIG. 3*b* shows rod 28 being moved further upward in comparison with the orientation shown in FIG. 3*a*. The moving of rod 28 upward via actuator 16 causes an upper tapered surface 37*a* of gripper contact section 28*e* to contact a lower tapered surface 35 of upper protrusion 33*a* of each gripper 30*a*. This contact causes grippers 33*a* to rotate about the respective gripper axis GA defined by a center of the respective fastener 46 so upper ends 33*d* of grippers 30*a* move radially outward and away from each other and lower ends 33*e* of grippers 30*a* move radially inward and toward each other. The inward radial movement of lower ends 33*e* of grippers 30*a* causes a gripping surface 33*f* of each lower protrusion 33*c* to contact an outer circumferential surface 59 of movable section 56*a* at groove 58.

FIG. 3*c* shows rod 28 being moved further upward in comparison with the orientation shown in FIG. 3*b*. Grippers 30*a* are in the same orientation as in FIG. 3*b*, with gripping surfaces 33*f* of each lower protrusions 33*c* contacting the outer surface of movable section 56*a* of CRDS 56 at groove 58. The moving of rod 28 upward via actuator 16 pulls movable section 56*a* of CRDS 56 upward by a distance Y such that CRDS 56 is released from the corresponding control rod assembly. Between the configuration in FIG. 3*b* and the configuration in FIG. 3*c*, gripper contact section 28*e* has forced gripper assembly 30 upward by an uppermost surface 37*b* of gripper contact section 28*e* contacting the lower surface of upper plate 42*b* of gripper assembly 30. The upward movement of rod 28 has caused gripper assembly 30 to further compress spring 52 between a lower surface of an upper plate section 60 of inner support section 26*f* (FIG. 3*b*) and the upper surface of upper plate 42*b* of gripper assembly 30. Cylindrical section 42*e* of lower section 42*c* of gripper assembly 30 has been lifted upward out of contact with stationary section 56*b* of CRDS 56. During the upward lifting of movable section 56*a* of CRDS 56, upper protrusions 33*a* remain in contact with gripper contact section 28*e*.

Similarly, gripper assembly 30 can be used to reconnect CRDS 56 to the corresponding control rod assembly by gripping movable section 56*a* at groove 58 and moving gripper assembly 30 downward via the axial movement of rod 28 by actuator 16. Once gripper assembly 30 is moved downward into the position shown in FIG. 3*b*, rod 28 is moved further downward such that the upper surface of the moves out of contact with upper protrusion 33*a* and the lower surface 37*c* of gripper contact section 28*e* contacts the upper surface 49 of protrusion 33*b*. The downward movement of gripper contact section 28*e* into the upper surface 49 of protrusion 33*b* forces the lower end 33*e* of grippers 30*a* radially outward, causing grippers 30*a* to release movable section 56*a* of CRDS 56.

Figure 4A:
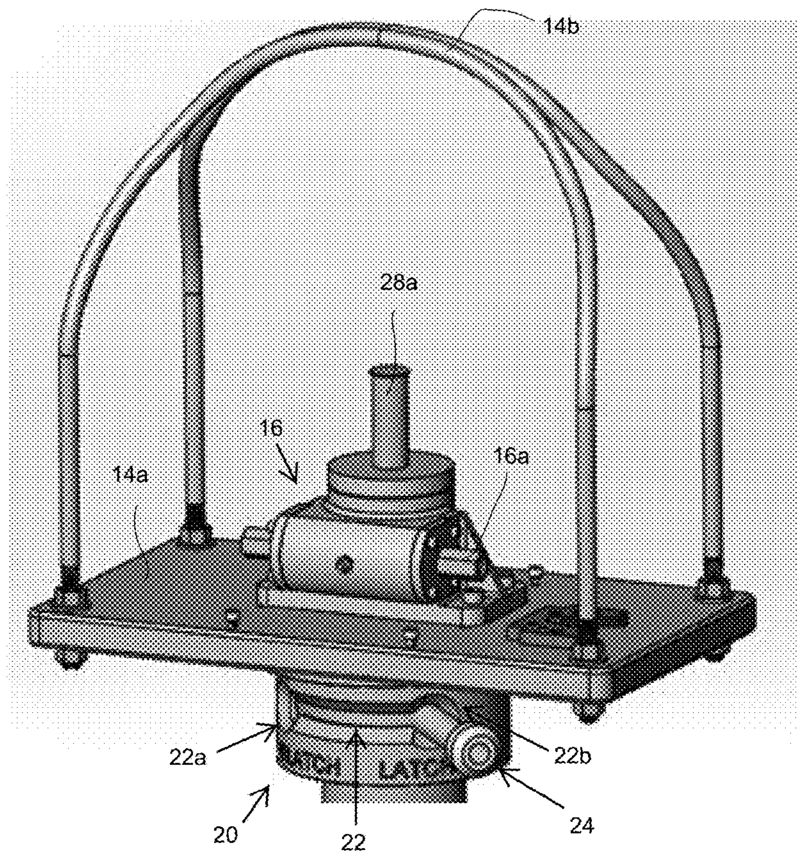
FIGS. 4*a* to 4*f* show a plurality of views illustrating the operation of latches of the unlatching tool.
Figure 4B:
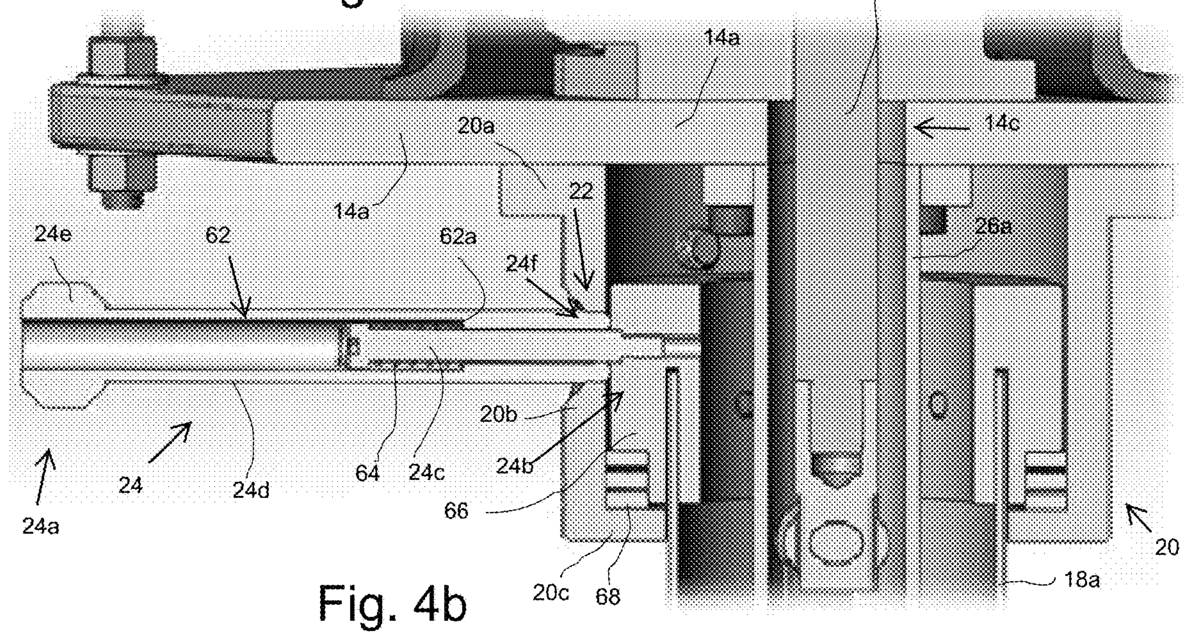
Figure 4C:
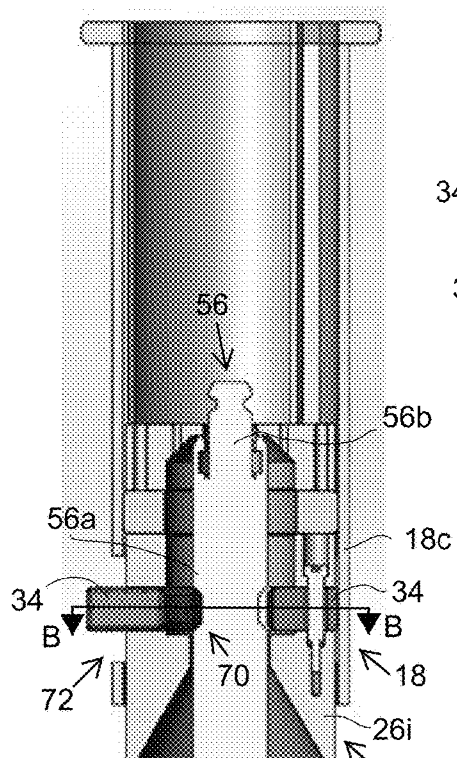
Figure 4D:
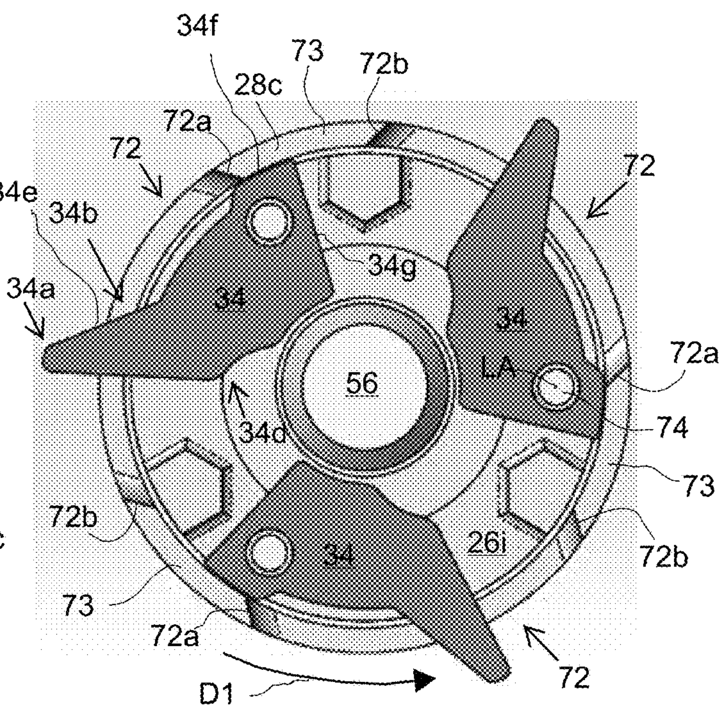
Figure 4E:
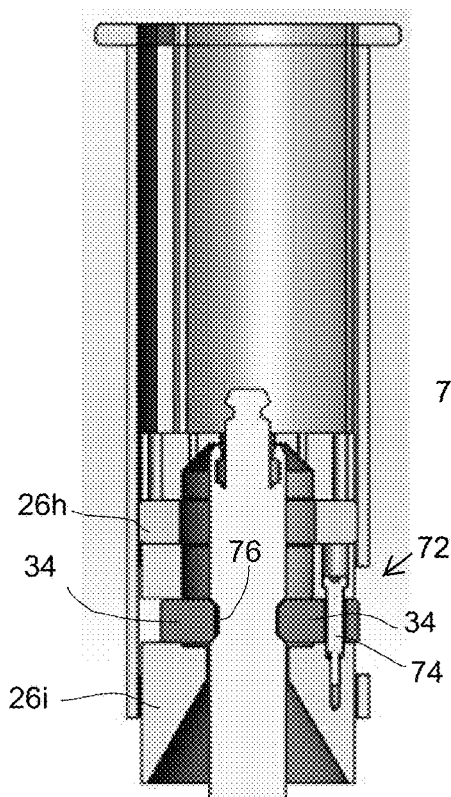
Figure 4F:
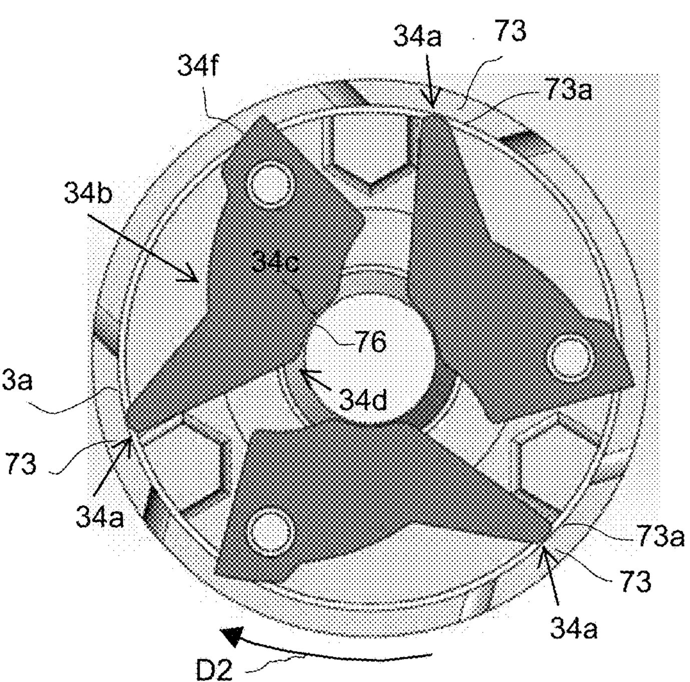

FIGS. 4*a* to 4*f* show a plurality of views illustrating the operation of latches 34. FIG. 4*a* illustrates a perspective view of bail assembly 14, actuator 16, upper base section 20 and actuator 24 and FIG. 4*b* illustrates a radial cross-sectional view of a portion of bail assembly 14, upper base section 20 and actuator 24. FIGS. 4*c* and 4*d* illustrate a radial cross-sectional view and axial cross-sectional view, respectively, of latches 34 in the unlatched orientation; and FIGS. 4*e* and 4*f* illustrate a radial cross-sectional view and axial cross-sectional view, respectively, of latches 34 in the latched orientation.

FIG. 4*a* shows upper base section 20 fixed to a bottom surface of base plate 14*a* of bail assembly 14. A handle 14*b* extends upward from base plate 14*a* and is formed by four post sections that converge above actuator 16 and upper rod section 28*a*. Handle 14*b* is used to hang tool 10 from the refueling bridge hoist for operation of actuators 16, 24 operated from the refueling bridge work platform. Upper base section 20 extends downward from base section 20 and includes the slot 22 formed therein for the actuation of actuator 24 between a latched orientation and an unlatched orientation, which will be further described with respect to FIGS. 4*c* to 4*f*. Slot 22 includes two enlarged ends 22*a*, 22*b*, with enlarged end 22*a* defining a unlatching stop for holding latches 34 in the unlatched orientation and enlarged end 22*b* defining a latching stop for holding latches 34 in the latched orientation.

FIG. 4*b* shows a radial cross-sectional view of base section 20, actuator 24 and upper ends of support sections 18, 26. Actuator 24 includes a free end 24*a* configured for gripping by an operator and a base end 24*b* fixed to the upper end of outer assembly 18. Actuator 24 includes a fixed portion 24*c* that is fixed to outer assembly 18 and a movable portion 24*d* that movable radially outward away from outer section 18. Movable portion 24*d* is hollow and includes a stepped bore 62 passing therethrough. Fixed portion 24*c* is received in bore 62 and is biased away from a step 62*a* of stepped bore 62 by a coil spring 64 received in bore 62. The operator pulls an enlarged portion 24*e* at free end 24*a* to compress spring 64 and force movable portion 24*d* away from outer section 18. A contact end 24*f* of movable portion 24*d*, which is received in slot 22 in a non-actuated position, is pulled out of slot 22 by the radially outward force applied by the operator such that movable portion 24*d* is circumferentially movable with respect to base section 20 so movable portion 24*d* is movable between the unlatched orientation and the latched orientation. For example, if actuator 24 is in the non-actuated position, with spring 64 forcing contact end 24*f* into enlarged end 22*a* and thus preventing the circumferential movement actuator 24 and outer section 18, the operator pulls movable portion 24*d* radially outward to compress spring 64 such that actuator 24 is movable within slot 22 to enlarged end 22*b*. This actuates actuator 24 and outer assembly 18 from the unlatched orientation to the latched orientation. For example, if actuator 24 is in the non-actuated position, with spring 64 forcing contact end 24*f* into enlarged end 22*b* and thus preventing the circumferential movement actuator 24 and outer section 18, the operator pulls movable portion 24*d* radially outward to compress spring 64 such that actuator 24 is movable within slot 22 to enlarged end 22*a*. This actuates actuator 24 and outer assembly 18 from the latched orientation to the latched orientation.

As shown in FIG. 4*b*, the upper end of outer assembly 18, i.e., the upper end of upper outer section 18*a*, includes a connecting section 66, with base end 24*b* of actuator 24, more specifically a threaded end of fixed portion 24*c*, being fixed in a hole in connecting section 66. Connecting section 66 is thicker than a remainder of outer section 18*a*. Base section 20 includes a flange 20*a* fixed in contact with the lower surface of base plate 14, a cylindrical section 20*b* extending downward from flange 20*a* and an annular plate 20*c* surrounding the upper end of outer assembly 18. Connecting section 66 is received inside of base section 20 and is supported on annular plate 20*c* by a thrust bearing 68 that is received in a step formed in connecting section 66 and is axially sandwiched between connecting section 66 and annular plate 20*c*.

The upper end of inner support assembly 26, i.e., the upper end of inner support section 26*a*, is received inside of base section 20 radially inside of outer assembly 19 and is fixed in contact with the lower surface of base plate 14*a* surrounding a hole 14*c* formed in base plate 14*a*. Upper rod section 28*a* of rod 28 is received radially inside of the upper end of inner support assembly 26 and extends upward through base plate 14*a* via hole 14*c*.

Figure 5:
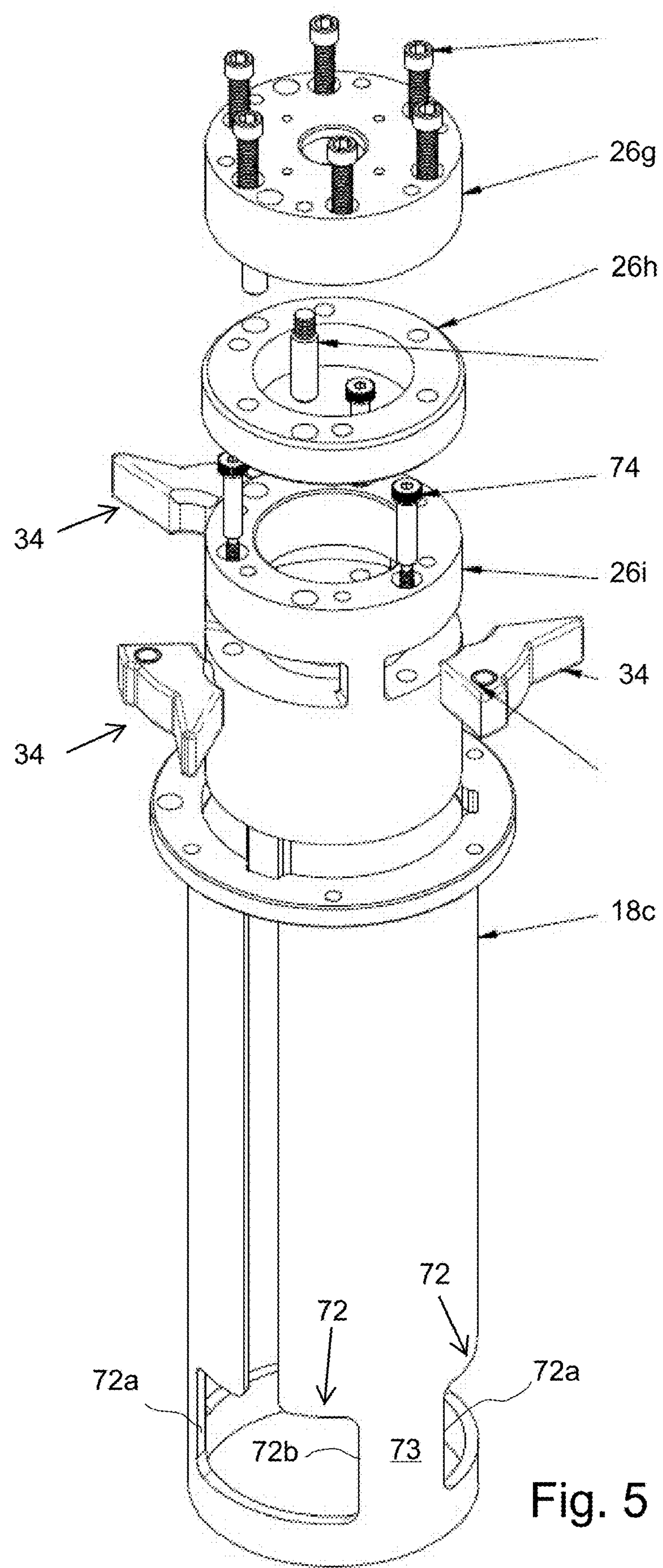
FIG. 5 shows an exploded view of an outer section, inner support sections and latches of the unlatching tool.

Referring now to FIGS. 4*c* to 4*f* (gripper assembly 30 is omitted from FIGS. 4*c* and 4*e* for clarity), latches 34 are rotatably fixed to inner support assembly 26 at lowermost inner support section 26*i*. FIGS. 4*c* and 4*d* show latches 34 in the unlatched orientation and FIGS. 4*e* and 4*f* show latches 34 in the latched orientation. In FIG. 4*c*, tool 10 is installed onto CRDS 56 such that the upper end of CRDS 56 is received in inner support assembly 26 and lowermost inner support section 26*i* encircles a portion of stationary section 56*b*. Inner support section 26*h*, which is a bushing, also encircles the outer circumferential surface of stationary section 56*b* of CRDS 56, while also contacting the inner circumferential surface of outer section 18*c*. When inner support assembly 26 is in the orientation shown in FIG. 4*c*, gripping assembly 30 is in the orientation shown in FIG. 3*a*, with cylindrical section 42*e* of lower section 42*c* of gripping assembly 30 lying in the annular space formed between the upper end of stationary section 56*b* and the outer circumferential surface of movable section 56*a*. Tool 10 is configured such that when inner support section 26*g* rests on stationary section 56*b* in such a manner, inner support assembly 26 is axially aligned such that latches 34 are aligned with an annular groove 70 formed in the outer circumferential surface of stationary section 56*b*, as shown in FIG. 4*c*. In their unlatched orientation, latches 34 protrude radially outward through windows 72 formed in outer assembly 18 at lower outer section 18*c*. FIG. 5 shows an exploded view of outer section 18*c*, inner support sections 26*g*, 26*h*, 26*i* and latches 34, and illustrating windows 72

As shown in FIG. 4*d*, which is taken along B-B in FIG. 4*c*, a tip 34*a* of each latch extends through a respective window 72 formed in outer section 28. Windows 72 each extend circumferentially between respective a first circumferential edge 72*a* and a respective second circumferential edge 72*b*. Circumferential edges 72*a*, 72*b* are formed by circumferentially spaced wall sections 73 of outer section 18*c*. Latches 34 are each rotatably fixed to inner support section 26 by a respective fasteners 74 extending axially into lowermost inner support section 26*i*. Latches 34 each are rotatable with respect to inner support section 26 about a respective axially extending latch axis LA at a center of the respective fastener 74. Latches 34 are axially fixed in place with respect to inner support section 26 by fasteners 74 such that an axial position of the each latch 34 remains constant during the rotating of outer section 18 in rotational directions D1, D2. In the unlatched orientation shown in FIGS. 4*c* and 4*d*, actuator 24 is held in the unlatched stop formed by enlarged end 22*b* of slot 22 (see FIG. 4*a*).

In order to actuate latches 34 from the unlatched orientation in FIGS. 4*c* and 4*d* to the latched orientation in FIGS. 4*e* and 4*f*, outer assembly 18 is rotated in rotational direction D1 shown in FIG. 4*d*. This rotation can be accomplished by the operator pulling actuator 24 (FIG. 4*a*) radially outward and moving the actuator 24 in rotation direction D1. As actuator 24 is fixed to outer assembly 18, movement of actuator 24 in direction D1 causes outer assembly 18 to also move in direction D1. As outer assembly 18 is moved in direction D1, edge 72*a* of each window 72 contacts a portion 34*e* of a respective outer surface 34*b* of the respective latch 34 to force tips 34*a* of latches 34 radially inward. Outer assembly 18 is rotated in direction D1 until an inner circumferential surface 73*a* of a respective wall section 73 is in contact with the tip 34*a* of the respective latch 34. As tips 34*a* are forced radially inward, a contact surface 34*c* of an inner surface 34*d* of each 34 latch is forced radially inward into contact with the outer circumferential surface 76 of CRDS 56 at groove 70. Inner surface 34*d* and outer surface 34*c* merge at tip 34*a*. The contact between contact surface 34*c* and outer circumferential surface 76 holds tool 10, in particular inner support section 26, axially in place on stationary section 56*b* of CRDS 56. This latched orientation is shown in FIGS. 4*e* and 4*f*. Once in this latched orientation, actuator 24 is held in the latched stop formed by enlarged end 22*b* of slot 22 (see FIG. 4*a*). Accordingly, between the unlatched orientation shown in FIGS. 4*c* and 4*d* and the latched orientation shown in FIGS. 4*e* and 4*f*, actuator 24 is rotated in direction D1 from the unlatched stop formed by enlarged end 22*a* of slot 22 to the latched stop formed by enlarged end 22*b* of slot 22. Once actuator 24 enters into the latched stop formed by enlarged end 22*b* of slot 22, the radially inward force applied to movable portion 24*d* by spring 64 forces end 24*f* of movable portion 24 into a locked position in enlarged end 22*b*.

To actuate latches 34 from the latched orientation shown in FIGS. 4*e* and 4*f* to the unlatched orientation shown in FIGS. 4*c* and 4*d*, actuator 24 is rotated in a rotational direction D2, which is opposite of direction D1, from the latched stop formed by enlarged end 22*b* of slot 22 to the unlatched stop formed by enlarged end 22*a* of slot 22. Once actuator 24 enters into the unlatched stop formed by enlarged end 22*a* of slot 22, the radially inward force applied to movable portion 24*d* by spring 64 forces end 24*f* of movable portion 24 into a locked position in enlarged end 22*a*. As outer assembly 18 is moved in direction D2, edge 72*b* of each window 72 contacts a further portion 34*f* of the outer surface 34*b* of the respective latch 34 to force tips 34*a* of latches 34 radially outward through the respective window 72. Portion 34*f* is on an opposite end of outer surface 34*b* as portion 34*e* and tip 34*a*. Outer assembly 18 is rotated in direction D2 until a further surface 34*g* of latch 34 is arranged between the inner circumferential surface 73*a* of the respective wall section 73 and movable portion 56*b*, and the inner circumferential surface 73*a* of the respective wall section 73 is in contact with portion 34*f* of the outer surface 34*b* of the respective latch 34, as shown by the position in FIG. 4*d*. Further surface 34*g* extends from inner surface 34*d* to portion 34*f* of outer surface 34*b* and is on an opposite end of latch 34 as tip 34*a*. As tips 34*a* are forced radially outward, contact surface 34*c* of each 34 latch is forced radially outward out of contact with the outer circumferential surface 76 of CRDS 56 at groove 70.

Tool 10 is latched into place on CRDS 56 before gripper assembly 30 is actuated to lift movable section 56*a* of CRDS 56 upward to release CRDS 56 from the attached control rod assembly.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. An unlatching tool configured for actuating a movable section of a control rod drive shaft in a pressurized water reactor, the unlatching tool extending longitudinally along a center axis and comprising:

a base;

an outer assembly rotatably fixed to the base;

an inner support assembly non-rotatably fixed to the base;

a gripper assembly movably coupled to the base and configured for gripping the movable section of the control rod drive shaft;

a latch rotatably coupled to the inner support assembly for rotation about a latch axis extending parallel to a center axis of the unlatching tool; and a latch actuator fixed to the outer assembly and configured for rotating the outer assembly in a first rotational direction about the center axis of the unlatching tool such that the latch is rotated about the latch axis radially inward with respect to the center axis of the unlatching tool, the outer assembly being configured such that an inner circumferential surface of the outer assembly contacts a tip of the latch to hold the latch against an outer circumferential surface of a stationary section of the control rod drive shaft.

2. The unlatching tool as recited in claim 1 wherein the outer assembly includes a window extending circumferentially between a first circumferential edge and a second circumferential edge of the outer assembly, the outer assembly configured for contacting a portion of an outer surface of the latch to force the latch radially inward with respect to the center axis during the rotation of the outer assembly in the first rotational direction about the center axis of the unlatching tool by the latch actuator.

3. The unlatching tool as recited in claim 2 wherein the outer assembly is configured for contacting a further portion of the outer surface of the latch to force the latch radially outward with respect to the center axis by rotating the outer assembly in a second rotational direction about the center axis of the unlatching tool by the latch actuator.

4. The unlatching tool as recited in claim 1 wherein the latch actuator includes a fixed portion fixed to the outer assembly and a movable portion movable radially with respect to the center axis.

5. The unlatching tool as recited in claim 4 wherein the base includes a slot formed therein receiving a contact end of the movable portion, the latch actuator including a spring biasing the movable portion toward the slot.

6. The unlatching tool as recited in claim 5 wherein the slot includes an unlatching stop for holding the latch in an unlatched orientation and a latching stop for holding the latch in the latched orientation, the movable portion being movable radially outward with respect to the center axis to further compress the spring to allow for the latch actuator to be movable in the slot between the unlatching stop and the latching stop.

7. The unlatching tool as recited in claim 1 wherein the unlatching tool comprises a mechanical actuator fixed to the base and configured to raise and lower the gripper assembly.

8. The unlatching tool as recited in claim 7 wherein the mechanical actuator is a screw jack.

9. The unlatching tool as recited in claim 1 wherein the gripper assembly is configured such that raising of the gripper assembly forces grippers of the gripper assembly radially inward with respect to the center axis.

10. A method for actuating a movable section of a control rod drive shaft comprising:

installing the unlatching tool as recited in claim 1 on the control rod drive shaft;

latching the unlatching tool to the stationary section of the control rod drive shaft; and raising a rod connected to the gripper assembly to cause the gripper assembly to grip the movable section and move the movable section upward.

11. The method as recited in claim 10 wherein the installing of the unlatching tool on the control rod drive shaft includes contacting and opening a c-ring of the control rod drive shaft with a lower edge of the gripper assembly.

12. The method as recited in claim 10 wherein the latching of the unlatching tool to the stationary section of the control rod drive shaft includes actuating the latch actuator to move the latch into contact with the outer circumferential surface of the stationary section of the control rod drive shaft.

13. The method as recited in claim 12 wherein the actuating of the latch actuator includes forcing the latch actuator radially outward with respect to the center axis and moving the latch actuator circumferentially.

14. The method as recited in claim 12 wherein the latch actuator is fixed to an outer section of the unlatching tool, the actuating of the latch actuator including rotating the outer section in the first rotational direction.

15. The method as recited in claim 14 further comprising unlatching the unlatching tool from the stationary section of the control rod drive shaft by rotating the outer section in a second rotational direction opposite of the first rotational direction.

16. The method as recited in claim 14 wherein an axial position of the latch remains constant during the rotating of the outer section in the first rotational direction.

17. The method as recited in claim 14 wherein the latch rotates about the latch axis extending parallel to the center axis of the unlatching tool during the moving of the latch into contact with the outer circumferential surface of the stationary section of the control rod drive shaft.

18. The method as recited in claim 14 wherein the actuating of the latch actuator includes contacting an outer surface of the latch with a circumferential edge of a wall portion of the outer section to force a contact surface of the latch radially inward with respect to the center axis toward the stationary section of the control rod drive shaft.

19. The method as recited in claim 18 wherein the actuating of the latch actuator includes contacting the tip of the latch with an inner circumferential surface of the wall portion to force the contact surface of the latch radially inward with respect to the center axis into contact with the stationary section of the control rod drive shaft.

* * * * *